US009650556B2

(12) United States Patent
Oxley et al.

(10) Patent No.: US 9,650,556 B2
(45) Date of Patent: May 16, 2017

(54) ENCAPSULATION OF HIGH TEMPERATURE MOLTEN SALTS

(71) Applicants: Southwest Research Institute, San Antonio, TX (US); Terrafore, Inc., Minneapolis, MI (US)

(72) Inventors: James D. Oxley, San Antonio, TX (US); Anoop Kumar Mathur, Shoreview, MN (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 134 days.

(21) Appl. No.: 13/749,446

(22) Filed: Jan. 24, 2013

(65) Prior Publication Data
US 2014/0202541 A1    Jul. 24, 2014

(51) Int. Cl.
C09K 5/12        (2006.01)
C09K 5/06        (2006.01)
F28D 20/02       (2006.01)

(52) U.S. Cl.
CPC ............. *C09K 5/12* (2013.01); *C09K 5/063* (2013.01); *F28D 20/023* (2013.01); *Y02E 60/145* (2013.01); *Y02E 70/30* (2013.01); *Y10T 137/0318* (2015.04); *Y10T 428/2989* (2015.01)

(58) Field of Classification Search
CPC .................................. C09K 5/12; C09K 5/063
USPC ..... 137/1; 165/104.12, 104.15, 104.19, 920; 428/402–402.24, 403, 404, 407, 321.1, 428/474.4; 427/331, 389.9, 212, 427/213–213.36, 483, 256; 264/534, 5, 264/41, 4–4.7; 424/400, 408, 450, 451, 424/455, 93.7, 184.1, 497, 489, 501, 490, 424/491, 4, 92, 493, 494, 495
See application file for complete search history.

(56) References Cited

U.S. PATENT DOCUMENTS

| | | | |
|---|---|---|---|
| 4,219,072 A | 8/1980 | Barlow, Sr. | |
| 4,505,953 A | 3/1985 | Chen et al. | |
| 4,512,388 A | 4/1985 | Claar et al. | |
| 4,513,053 A | 4/1985 | Chen et al. | |
| 4,777,154 A | 10/1988 | Torobin | |
| 4,873,038 A | 10/1989 | Rapp et al. | |
| 5,007,478 A | 4/1991 | Sengupta | |
| 5,207,268 A | 5/1993 | Krause et al. | |
| 6,652,771 B2 | 11/2003 | Carn | |
| 9,493,695 B2 * | 11/2016 | Ram ................. | C08G 73/1035 |
| 2002/0103074 A1 * | 8/2002 | Wheelock et al. ........... | 502/159 |
| 2005/0247906 A1 | 11/2005 | Neuschutz et al. | |
| 2007/0148447 A1 * | 6/2007 | Amundson et al. .......... | 428/357 |
| 2008/0135245 A1 * | 6/2008 | Smith et al. ............... | 166/280.2 |
| 2010/0087115 A1 * | 4/2010 | Davis et al. ................ | 442/136 |
| 2010/0230075 A1 | 9/2010 | Mathur et al. | |
| 2012/0018116 A1 | 1/2012 | Mathur et al. | |

OTHER PUBLICATIONS

"Phase-Change Thermal Energy Storage" Final Subcontract Report on the Symposium held Oct. 19-20, 1988, Helendale, CA, Luz International Ltd., Solar Energy Research Institute, and CBY Associates, Inc.; Prepared under Subcontract No. HH-9-18108-1, for the US Dept. of Energy; Report No. SERI/STR-250-3516, US Category: 202 DE89009426; Nov. 1989 (151 pgs).
Groenendaal, B.J.; Solar Thermal Power Technologies, Monograph in the Framework of the VLEEM Project, Jul. 2002, ECN-C-02-062 (50 pgs).
Kelly, B., et al; "Thermal Storage Commercial Plant Design Study for a 2-Tank Indirect Molten Salt System"; Final Report May 13, 2002-Dec. 31, 2004; National Renewable Energy Laboratory, Subcontract Rpt. NREL/SR-550-40166, Jul. 2006; prepared under Subcontact No. AAA-2-32432-01 (32 pgs).
"Survey of Thermal Storage for Parabolic Trough Power Plants"; Pilkington Solar International GmbH; National Renewable Energy Laboratory (NREL) Subcontractor's Report NREL/SR-550-27925; for Period of Performance: Sep. 13, 1999-Jun. 12, 2000 (61 pgs).
Shin, Y., et al, "Development of Thermoregulating Textile Materials With Microencapsulated Phase Change Materials (PCM). IV. Performance Properties and Hand of Fabrics Treated with PCM Microcapsules"; Journal of Applied Polymer Science, Vo. 97, 2005, Thermoregulating Textile Material IV (pp. 910-915).
Su, J-F., et al; Preparation and Characterization of Polyurethane Microcapsules Containing n-Octadecane with Styrene-Maleic Anhydride as a Surfactant by Interfacial Polycondensation, Journal of Applied Polymer Science, vol. 102, 2006, (pp. 4996-5006).
Tamme, R., "Phase-Change Storage Systems"; Workshop on Thermal Storage for Trough Power Systems, Feb. 20-21, 2003, Golden CO. (21 pgs).
U.S. Office Action issued Jan. 15, 2015 in U.S. Appl. No. 13/187,398 (18 pgs).
U.S. Office Action issued Apr. 23, 2015 in U.S. Appl. No. 13/187,398 (20 pgs).
U.S. Office Action issued Mar. 22, 2016 in U.S. Appl. No. 13/187,398 (21 pgs).

* cited by examiner

*Primary Examiner* — Margaret Moore
(74) *Attorney, Agent, or Firm* — Grossman, Tucker et al.

(57) ABSTRACT

The present disclosure relates to a method of encapsulating microcapsules containing relatively high temperature phase change materials and the microcapsules so produced. The microcapsules are coated with an inorganic binder, film former and an inorganic filler. The microcapsules may include a sacrificial layer that is disposed between the particle and the coating. The microcapsules may also include an inner coating layer, sacrificial layer and outer coating layer. The microcapsules are particularly useful for thermal energy storage in connection with, e.g., heat collected from concentrating solar collectors.

12 Claims, 17 Drawing Sheets

200 μm

200 μm

US 9,650,556 B2

ENCAPSULATION OF HIGH TEMPERATURE MOLTEN SALTS

GOVERNMENT SUPPORT CLAUSE

This invention was made with United States Government support under Contract No. DE-F0A0000104 awarded by the U.S. Department of Energy. The government has certain rights in the invention.

FIELD OF INVENTION

The present disclosure relates to a process for the encapsulation of relatively high temperature phase change materials and, in particular, the encapsulation of relatively high temperature molten salts having melting points in the range of 200° C. to 600° C.

BACKGROUND

Phase change materials (PCM) are substances with a relatively high heat-of-fusion or latent-heat capable of storing and releasing relatively large amounts of energy when they melt or solidify. PCM's may include inorganic salts, eutectic mixtures of inorganic salts, salt hydrates, fatty acids and esters, and various paraffins. Applications for PCM's include thermal systems in buildings, vehicles and spacecraft, thermal energy storage including solar thermal energy storage, solar central particle receivers or concentrating solar collectors, textiles, cooling and heating of electrical engines, cooling of foods and beverages, hot/cold therapies, waste heat recovery, etc.

SUMMARY

The present disclosure relates to a method of encapsulating phase change materials and the microcapsules so produced. One may first supply a phase change material having a melting point in the range of 200° C. to 600° C. and a largest cross-sectional dimension of 0.5 mm to 100 mm. A coating is then applied to the phase change material wherein the coating includes an inorganic binder, a film former comprising an organic polymer at a molecular weight (MW) of greater than or equal to 5000, and an inorganic filler at a particle size of less than or equal to 50 µm and wherein said coating has a thickness of 50 µm to 1000 µm. This may then be followed by heating the coating wherein at least a portion of the organic polymer of said film former is removed. In addition, the microcapsule may further include a sacrificial layer that is disposed between the particle and the coating layer wherein heating of the coating removes the sacrificial layer and provides a space between the coating layer and the particle.

Another aspect of the present disclosure again relates to a method of encapsulating a phase change material. One may again supply a phase change material having a melting point of 200° C. to 600° C. and a largest cross-sectional dimension of 0.5 mm to 100 mm. An inner coating is then applied to the phase change material wherein the inner coating includes an inorganic binder, a film former comprising an organic polymer at a MW of greater than or equal to 5000, and an inorganic filler at a particle size of less than or equal to 50 µm and wherein the inner coating has a thickness of 1.0 µm to 100 µm. This may again be followed by applying a sacrificial layer, wherein the sacrificial layer has a thickness of 1.0 µm to 500 µm. One may then apply an outer coating layer over the sacrificial layer wherein the outer coating includes an inorganic binder, a film former comprising an organic polymer at a MW of greater than or equal to 5000, and an inorganic filler at a particle size of less than or equal to 50 µm and wherein said outer coating has a thickness of 1.0 µm to 500 µm. Heating then results in removal of the sacrificial layer and at least a portion of the film former of both the inner and outer coatings.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

The present disclosure relates to a process for the encapsulation of relatively high temperature phase change materials and, in particular, the encapsulation of relatively high temperature molten salts (inorganic salts or mixtures of inorganic salts) having melting points in the range of 200° C. to 600° C. The microcapsule shells remain intact or thermally stable (i.e., they do not crack or break apart) at elevated temperatures of up to 600° C. The present disclosure also relates to microcapsules produced by the methods discussed herein as well as the use of the microcapsules in various systems, including thermal energy storage systems.

As an initial matter, reference to high temperature phase change materials is understood herein as a reference to materials, such as molten salts, having a melting point in the range of 200° C. to 600° C. Furthermore, the phase change materials exhibit a latent heat of fusion that is equal to or greater than 1 kJ/mol, such as in the range of 0.5 kJ/mol to 3 kJ/mol, including all values and ranges therein. Molten salts for use herein include, for example, nitrates, nitrites, hydroxides, carbonates, chlorides of sodium, potassium, calcium, lithium and combinations thereof.

The relatively high temperature phase change materials are in the form of particles that preferably exhibit a largest cross-sectional dimension in the range of 0.5 millimeter to 100 millimeters, including all values and ranges therein, such as 0.5 millimeters to 50 millimeters, 1 millimeter to 10 millimeters, 25 millimeters to 50 millimeters, etc. In embodiments the particles may be prills. Prills are understood as granules of material that are formed into droplets as a melted liquid and solidify at room temperature. The size of the droplets and the resulting prills may be adjusted by using various processing methods. For example, prill size may be adjusted using screens of various sizes to form the drops or atomization to form relatively small prills.

Figure 1:
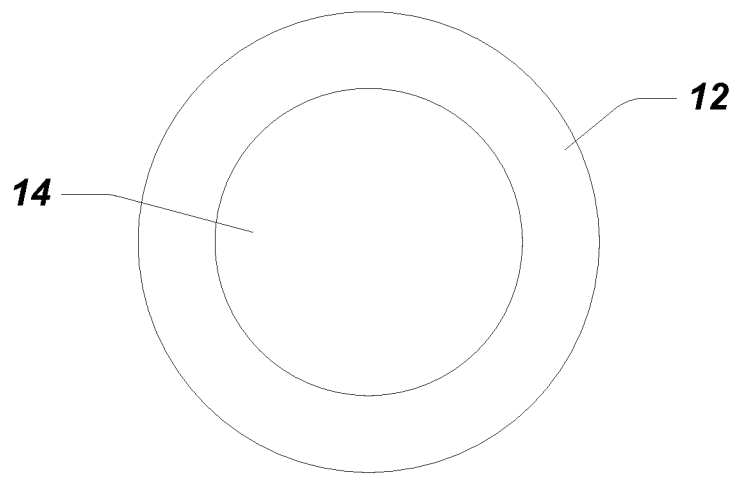
FIG. 1 is a schematic of an embodiment of a microencapsulated phase change material including a coating layer.

FIG. 1 illustrates a microencapsulated phase change composition, wherein one or more layers of a coating 12 are applied over the core particles 14 to form a microcapsule shell over the particle core. The coating layer includes a binder, film former and inorganic filler as discussed further herein. The coating may have a thickness in the range of 50 to 1000 microns, including all values and ranges therein, such as 50 microns to 500 microns. FIG. 1 may be understood as a first embodiment where the particles include the coating layer 12 as illustrated and as described more fully herein.

A binder herein may preferably amount to an inorganic solvent based binder which at elevated temperature will cure and provide adhesive strength. The solvents may be water (e.g. a particle based suspension) or an organic solvent based system. One preferred example of such an inorganic water based binder includes CERAMABIND™ 644 available from Aremco of Valley Cottage, N.H. CERMABIND™ 644 is a colloidal alumina binder. Accordingly, the binder may include an inorganic colloid including dispersed phase inorganic particles in a continuous phase (water) wherein the inorganic particles (e.g. Al) may be present at a size range of 1 nm to 1000 nm.

The film formers are utilized herein serve to augment the binder, thereby improving the initial continuity of the formed coating over the particle. The film formers may preferably be naturally derived organic polymers and may include plant proteins (e.g. zein or prolamine protein), hydroxyl-propyl methyl cellulose (HPMC), ethyl cellulose and carboxy ethyl cellulose. The film formers may also include organic polymers, such a poly(vinyl chloride). Reference herein to film formers therefore include resins of relatively high MW (e.g., greater or equal to 5000) that are capable of initially forming a film in the coating formulations identified herein. The film formers may be provided in a carrier including, for example, alcohol such as ethyl alcohol, water, or combinations thereof, in addition to a surfactant, such as sodium lauryl sulfate. As discussed more fully below, the film formers are preferably removed with heat treatment.

Inorganic fillers include, for example, clays (particles of mineral silicates), including functionalized clays (CLOSITE™ 30B), montmorillonite clay (CLOSITE™ NA+), silica and micronized stainless steel. The aforementioned montmorillonite clay may be provided in natural form or be specifically functionalized with quaternary ammonium salts. The inorganic fillers herein may be present at a particle size of less than or equal to 50 µm, such as in the range of 1 µm to 50 µm, including all values and ranges therein, such as 2 µm to 25 µm, 2 µm to 13 µm, etc.

In preferable embodiments, the binder is to be present at a range of 5% to 30% by weight relative to the combination of the binder, film former and inorganic filler, including all values and ranges therein, and preferably 15% to 25% by weight. The film former may preferably be present in the range of 1% to 10% by weight relative to the combination of the binder, film former and inorganic filler, including all values and ranges therein, such as from 2.0% to 5.0 and preferably 3.1%. The inorganic filler may preferably be present in the range of 50% to 90% by weight relative to the combination of the binder, film former and inorganic filler, including all values and ranges therein, preferably from 70% to 90%, more preferably from 70% to 85% by weight, and more preferably 78.0% to 79.0%.

In more preferable embodiments, the coating specifically includes as the binder a colloidal alumina binder, ethyl cellulose as the film former, and montmorillonite clay as the inorganic filler. In particularly preferable embodiments, the coating layer includes ethyl cellulose film former present in the range of 1% by weight to 10% by weight relative to the binder, film former and inorganic filler including all values and ranges therein and preferably 2% to 5% by weight; a colloidal alumina binder present in the range of 15% to 25% by weight relative to the binder, film former and inorganic filler, including all values and ranges therein and preferably 17% to 23% by weight; and unmodified montmorillonite clay inorganic filler present in the range of 70% to 85% by weight relative to the binder, film former and inorganic filler, including all values and ranges therein and preferably 75% by weight to 80% by weight.

Referring again to FIG. 1, while one coating layer is illustrated, it is to be understood that such coating layer may itself be include 10 applied layers of the coating material over the phase change material particle 14. The coating layer may be present in the range of 20% by weight to 60% by weight of the microencapsulated phase change composition (i.e. phase change particle and shell) including all values and increments therein, such as 25% to 55%, or 40%, etc. The coating layer may have a thickness in the range of 50 µm to 500 µm.

The coating layer (binder, film former and inorganic filler) which forms the shell may be applied via the use of solvents. Accordingly, a surfactant may be employed, such as sorbitan alkyl esters. Preferred sorbitan alkyl esters include sorbitan monooleate, available as SPAN 80. The surfactant, when present, is present in the range of 0.5% by weight to 1% by weight, including all values and range therein, relative to the combination of the binder, film former, inorganic filler and the surfactant. Solvents that may be employed include water, alcohol, acetone and tetrahydrofuran.

Figure 2:
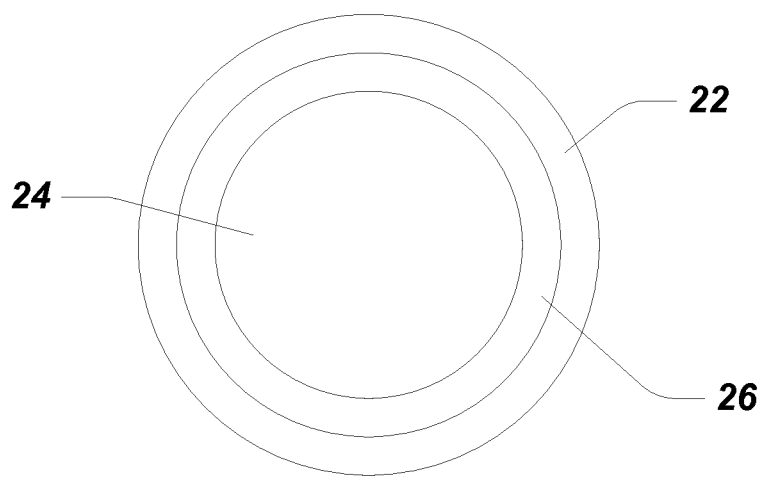
FIG. 2 is a schematic of an embodiment of a microencapsulated phase change material including a coating layer and a sacrificial layer.

In a further embodiment expanding upon FIG. 1 and as illustrated in FIG. 2, a sacrificial layer 26 in the microcapsule shell is optionally provided over the phase change particles 24 between the particle 24 and the coating layer 22. In forming the layers, the sacrificial layer 26 is first applied to the phase change particle 24 and then the coating 22 is applied over the phase change particle 24. The sacrificial layer, which is later removed by heating, ultimately provides a space that allows for or accommodates the thermal expansion of the phase change material.

The sacrificial layer 26 preferably includes an organic (carbon based) resin, such as a polymeric resin, that may be sacrificed (thermally degrade) upon exposure to heat. Accordingly, the sacrificial layer may include any resin that will degrade upon exposure to heat at a selected temperature. One may, e.g., utilize hydroxyl-propyl methyl cellulose, plant proteins (e.g. zein or prolamine protein), or ethyl cellulose. The sacrificial layer may be present in the range of 1% to 40% by weight of the microencapsulated phase change composition (i.e. phase change particle and shell) including all values and increments therein, such as 1% to 5% by weight, 3% to 35% by weight, 3% by weight etc. The sacrificial layer may have a thickness of 1.0 µm to 500 µm.

In preferable embodiments, where the microcapsule shells include, consist of, or consist essentially of a coating layer and a sacrificial layer, the coating layer again may preferably include a colloidal alumina binder, ethyl cellulose as a film former, a nanoclay as an inorganic filler, and hydroxypropyl methyl cellulose as a sacrificial layer (capable of thermal degradation). The ethyl cellulose film former is present in the coating layer at a range of 1% by weight to 10% by weight, the colloidal alumina binder present in the coating layer at a range of 15% by weight to 25% by weight and montmorillonite clay inorganic filler present in the coating layer at a range of 70% by weight to 85% by weight and the hydroxypropyl methyl cellulose as the sacrificial layer may be in the range of 1% to 20% by weight.

The sacrificial layer may be applied to the particles, for example, as a mixture or solution. The liquid phase includes, for example, water, alcohol such as ethyl alcohol, acetone, tetrahydrofuran or combinations thereof, such as ethyl alcohol and water. For example, in preferable embodiments, ethyl cellulose is utilized as a film former in the coating and hydroxypropyl methyl cellulose capable of thermal degradation is used as the sacrificial layer.

Figure 3:
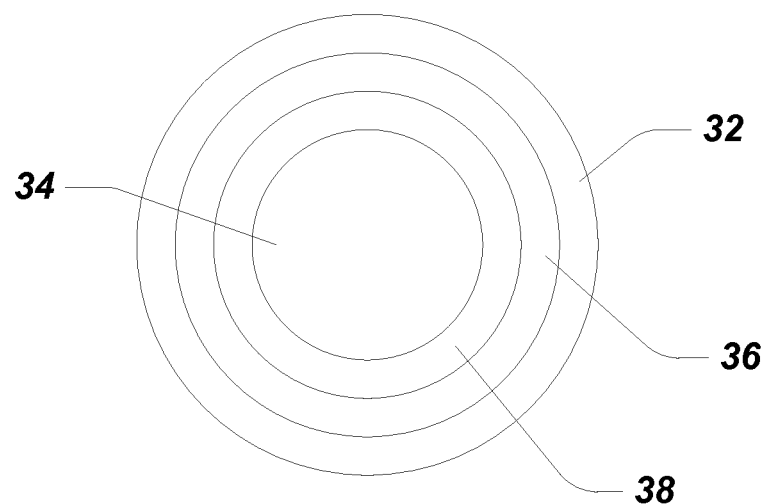
FIG. 3 is a schematic of an embodiment of a microencapsulated phase change material including a coating layer, a sacrificial layer and an inorganic layer.

FIG. 3 illustrates another embodiment where an inner coating 38 and outer coating 32 are disposed about particle 34. The coating layers may again be based upon the use of binder, film former and inorganic filler as noted herein. As illustrated, the inner coating layer 38 is disposed between the particle 34 and the sacrificial layer 36 and may have a thickness of 1.0 µm to 100 µm. The inner coating layer 38 so positioned may therefore serve to slow or prevent reaction of the particle 34 with the decomposing sacrificial layer 36. The outer coating layer may have a thickness of 1.0 µm to 500 µm.

Furthermore, as described above, the sacrificial layer 36 is now present between the inorganic layer 38 and coating layer 32 in the microcapsule shell and may have a thickness of 100 µm to 500 µm. The sacrificial layer is again sourced from a polymer resin that is designed to decompose upon the application of heat. The sacrificial layer may again include, consist of, or consist essentially of those polymer resins that may be used for the film former. An example again includes hydroxypropyl methyl cellulose (HPMC). However, the composition used for the sacrificial layer is preferably a different composition than the film former used in the coating and as noted, is also thermally degradable and capable of forming a space for expansion of the phase change material. For example, the film former used in the coating layer may be ethyl cellulose and the sacrificial layer may be formed of hydroxypropyl methyl cellulose.

In such embodiments, where the microcapsule shells include, consist of or consist essentially of an inner coating layer 38, a sacrificial layer 36 and an outer coating layer 32, the outer coating layer 32 is preferably present in the range of 20% by weight to 40% by weight including all values and increments therein of the encapsulated phase change composition, and preferably 25% by weight to 35% by weight, and more preferably 27% by weight to 31% by weight and more preferably, 29% by weight. The inner coating layer 38 is present in the range of 1% to 20% by weight of the encapsulated phase change composition, including all values and ranges therein, and preferably 5% to 15% by weight, and more preferably 7% to 11% by weight, and more preferably 9%. The sacrificial layer may be present in the range of 10% by weight to 30% by weight of the encapsulated phase change composition, including all values and increments therein, such as 15% to 25% by weight, 17% to 21% by weight, 19% by weight etc.

The microcapsule shell (inner coating layer, sacrificial layer and outer coating layer) may be present in the range of 22 wt % to 65 wt % of the microencapsulated phase change composition, including all values and ranges therein, such as 25% to 50%, 27% to 54%, 40%, 44%, 54%, etc. Thus, the phase change composition may be present in the range of 35% to 78% by weight, including all values and ranges therein. Furthermore, the average weight of the phase change particles may be in the range of 20 milligrams to 250 milligrams, including all values and ranges therein, such as 20 to 60 milligrams, 25 milligrams, 50 milligrams, etc.

The resulting coating (inner coating layer, sacrificial layer and outer coating layer) preferably has an overall thickness in the range of 50 μm to 1000 μm, including all values and ranges therein and preferably from 50 μm to 500 μm. The average size of the microencapsulated particles is in the range of 100 μm to 50 mm, including all values and ranges therein.

The microcapsule shells as described herein remain intact and thermally stable at temperatures of 200° C. or greater. For example, the microcapsules may remain thermally stable from 200° C. and up to 350° C., including all values and increments therein. In being thermally stable, it is understood that less than 5.0% of the microcapsule shells of a given sample rupture, including all values and ranges from 0% to 5.0%.

Furthermore, in embodiments where the microcapsule shell includes an inner coating layer, a sacrificial layer and an outer coating layer, the shells remain intact and thermally stable at temperatures of 200° C. and up to 600° C., wherein less than 5% of the microcapsule shells rupture, including all values and ranges from 0% to 5%.

Also disclosed herein is a method of encapsulating a phase change material and includes suspending or fluidizing particles of a phase change material in a medium and applying the microcapsule shell over the particles. Suspension or fluidizing as understood herein is the separation of the particles through a medium, such as by lifting of the particles apart from one another. In embodiments, the suspension medium includes air. However, other fluids may be used as a suspension medium as an alternative to or in addition to the air. For example, gases including inert gases or liquids such as water or organic solvents may be used. In suspension, the shell layers are sprayed on the particles.

Figure 4:
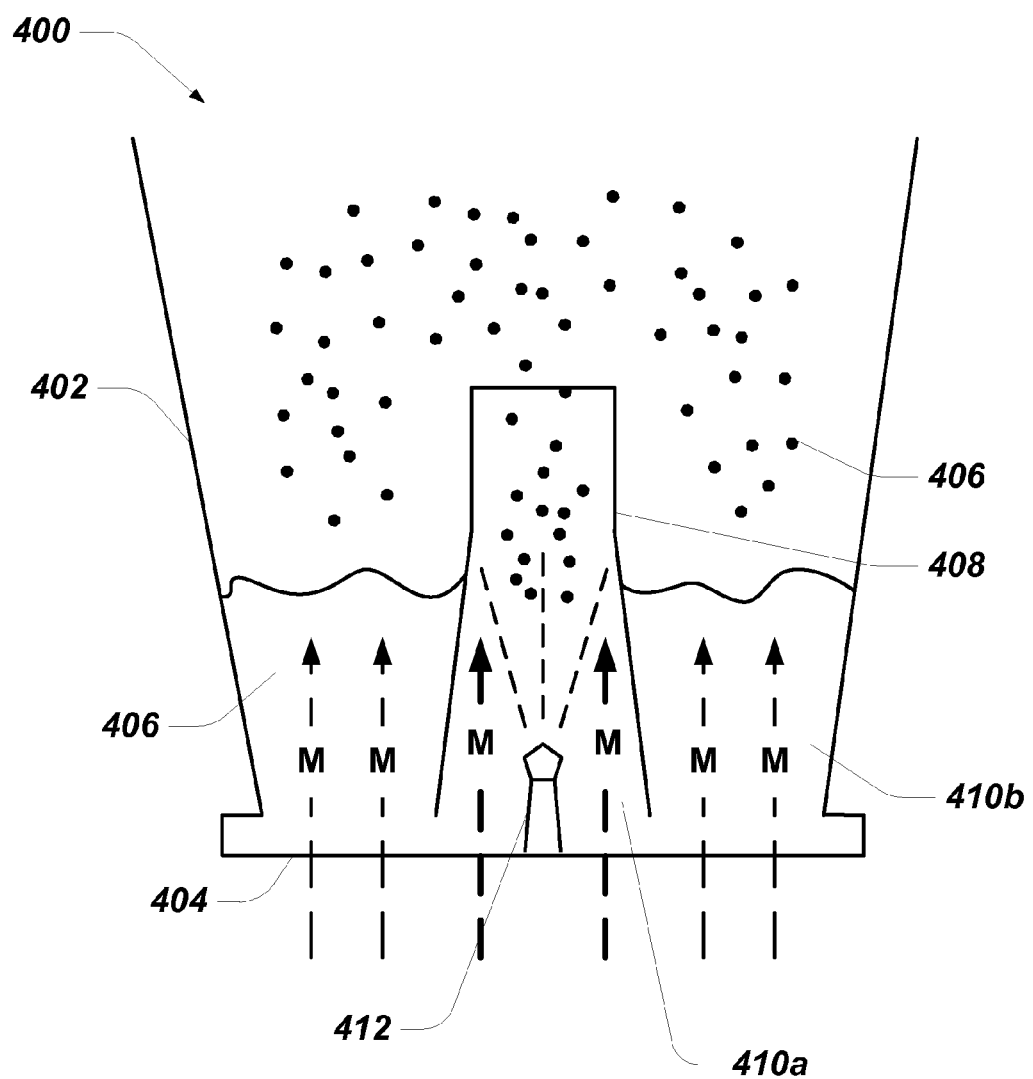
FIG. 4 is a schematic of an air suspension bed for coating the phase change materials.

Preferably, the phase change materials are suspended in a fluidized bed or an air suspension bed. FIG. 4 illustrates an air suspension bed including a Wurster insert useful for providing the coatings discussed herein. The air suspension bed 400 generally includes a containment vessel or a bowl 402 and a distribution plate at the base of the vessel 104 including a plurality of holes defined therein through which a suspension medium is supplied. Thus, the fluidized bed is generally defined by the walls of the vessel and the distribution plate at the bottom of the vessel. The suspension medium is fed into the vessel 402 through the plate and forced up through the particles 406 in the vessel. A partition 408, such as a funnel, is placed in the bottom of the bed and, optionally, in the center of the bed, forming a high-velocity region 410a of the fluidized bed. A spray nozzle 412 is provided in the high-velocity region 410a for applying the coating and other, optional layers over the particles.

In the high-velocity region 410a, the suspension medium M is forced through the distribution plate at a relatively high velocity, which forces the particles 406 at a relatively high velocity through the high-velocity region 410a where the particles 406 are separated and coating is applied. While still suspended by the suspension medium in the vessel, the coating dries. The particles then slow down, i.e., the force of gravity overcomes the drag force suspending the particles, and fall into the low-velocity region 410b of the vessel 402. In the low-velocity region 410b of the vessel, the suspension medium M is forced through the distribution plate at a sufficient velocity, which is relatively less than the velocity to feed the particles into the high-velocity region 410a, to allow the particles to circulate towards the bottom of the vessel, where the particles are drawn back into the partition 408.

After application of the coating layer 12 to the particles of phase change composition 14 (see again FIG. 1), the particles are heat treated. Such heat treatment may preferably be applied at temperatures of 400° C. or less. The heat treatment serves to remove all or a portion of the film former noted herein. For example, 80% or more of the film former may be removed and preferably 90% or more of the film former is removed. In addition, as illustrated in FIG. 2, if the sacrificial layer 26 is present, it too may be removed with such heat treatment. Accordingly, it may be appreciated that after heating, the coating may be described as a matrix of inorganic filler (e.g. clay) dispersed in a matrix of binder and film former residue.

The above identified particles contribute to the formation herein of a system for thermal energy storage. The microencapsulated phase change particles may be provided or packed in a storage stank. Thermal energy may be accumulated from, e.g., an active solar collector, steam or other heat source. A heat transfer fluid, such as oil, molten salts, or water, may transfer the heat from the heat source to the microencapsulated phase change particles, which contact the heat transfer fluid. In embodiments, the heat transfer fluid includes HITEC, a low melting molten salt mixture of inorganic nitrate salts. Upon melting, the particles absorb heat and upon cooling, the particles release their absorbed heat to a surrounding medium. It is therefore noted herein that a particular problem with solar collectors is that the temperatures that may be achieved can be relatively high, and in the range of 400° C. to 600° C. Accordingly, a need exists for phase change particles (alkali salts) that can be utilized in such temperature ranges. The coatings noted herein now provide a solution for this problem by way of their elevated temperature resistance.

Furthermore, relatively high surface areas may be preferred to promote relatively rapid heat transfer between the microencapsulated phase change materials and surrounding environment. Relatively high surface area containment may be achieved using microencapsulation where the beads of alkali salts herein are encapsulated within the identified protective shells. Final capsule size can be adjusted to change the surface area and heat transfer rate, and the protective shell also prevents mixing with surrounding fluids.

EXAMPLES

Example 1

Potassium nitrate prills were coated with various coating compositions described in Table 1 presented below. For the binder, Ceramabind 380 (referred to in the table as "380") and Ceramabind 644A (referred to in the table as "644A") were used. Film formers included, zein, hydroxypropyl methyl cellulose (HMPC), ethyl cellulose (EC), carboxy methyl cellulose (CMC) and poly(vinyl chloride) (PVC). Inorganic fillers included carbon black (carbon), montmorillonite clay functionalized with quaternary ammonium salts (Mod Clay), natural montmorillonite clay (Clay), and micronized stainless steel (Steel). Sorbitan monooleate was utilized as a surfactant (SPAN 80). Water and ethanol were used as solvents.

TABLE 1

Coating Compositions

| Sample | No. of Coatings | Binder (B) | % B | Film Former (FF) | % FF | Inorganic (I) | % I | Surfactant |
|---|---|---|---|---|---|---|---|---|
| 1 | 1 | | | | | | | |
| 2 | 1 | | | | | | | |
| 3 | 1 | | | | | | | |
| 4 | 1 | 380 | 100 | | | | | |
| 5 | 1 | 380 | 25 | | | Carbon | 75 | |
| 6 | 1 | 380 | 25 | | | Carbon | 75 | |
| 7 | 1 | 380 | 25 | | | Mod Clay | 75 | |
| 8 | 1 | 644A | 100 | | | | | |
| 9 | 1 | 644A | 75 | HPMC | 25 | | | |
| 10 | 1 | 644A | 30 | HPMC | 10 | Carbon | 60 | SPAN80 |
| 11 | 1 | 644A | 30 | HPMC | 10 | Mod Clay | 60 | SPAN80 |
| 12 | 1 | 644A | 30 | HPMC | 10 | Steel | 60 | SPAN80 |
| 14 | 1 | 644A | 30 | HPMC | 10 | Silica | 60 | SPAN80 |
| 15 | 2 | 644A | 30 | HPMC | 10 | Mod Clay | | SPAN80 |
| 16 | 2 | 644A | 30 | HPMC | 10 | Steel | 60 | SPAN80 |
| 17 | 2 | 644A | 30 | HPMC | 10 | Mod Clay | 60 | SPAN80 |
| 18 | 4 | 644A | 30 | HPMC | 10 | Mod Clay | 60 | SPAN80 |
| 19 | 4 | 644A | 86 | HPMC | 14 | | | SPAN80 |
| 20 | 2 | 644A | 32 | HPMC | 2.5 | Steel | 65 | SPAN80 |
| 21 | 2 | 644A | 30 | HPMC | 10 | Clay | 60 | SPAN80 |
| 22 | | | | HPMC | 100 | | | |
| 23 | 2 | 644A | 32 | HPMC | 2.5 | Clay | 65 | SPAN80 |
| 26 | | | | EC | 100 | | | |
| 27 | | | | Zein | 100 | | | |
| 28 | 2 | 644A | 75 | EC | 25 | | | SPAN80 |
| 29 | 2 | 644A | 30 | EC | 10 | Clay | 60 | SPAN80 |
| 30 | 2 | 644A | 27 | EC | 19 | Clay | 54 | SPAN80 |
| 31 | 2 | 644A | 32 | EC | 2.5 | Clay | 65 | SPAN80 |
| 32 | 2 | 644A | 32 | EC | 5 | Clay | 63 | SPAN80 |
| 33 | 4 | 644A | 32 | EC | 5 | Clay | 63 | SPAN80 |
| 34 | 4 | 644A | 32 | EC | 2.5 | Clay | 65 | SPAN80 |
| 35 | 2 | 644A | 32 | EC | 5 | Clay | 63 | SPAN80 |
| 36 | 2 | 644A | 32 | EC | 5 | Clay | 63 | SPAN80 |
| 37 | 2 | 644A | 32 | EC | 5 | Clay | 63 | SPAN80 |
| 38 | | | | CMC | 100 | | | |
| 39 | | | | CMC | 100 | | | |
| 41 | 2 | 644A | 32 | EC | 5 | Steel | 63 | SPAN80 |
| 42 | 2 | 644A | 32 | EC | 5 | Clay | 63 | SPAN80 |
| 43 | 2 | 644A | 30 | EC | 10 | Steel | 60 | SPAN80 |
| 44 | | | | HPMC | 100 | | | |
| 45 | 2 | 644A | 32 | EC | 5 | Clay/Steel | 32/32 | SPAN80 |
| 46 | 2 | 644A | 32 | EC | 5 | Clay/Steel | 47/16 | SPAN80 |
| 47 | | 644A | | PVC | 100 | | | |

Figure 5A:
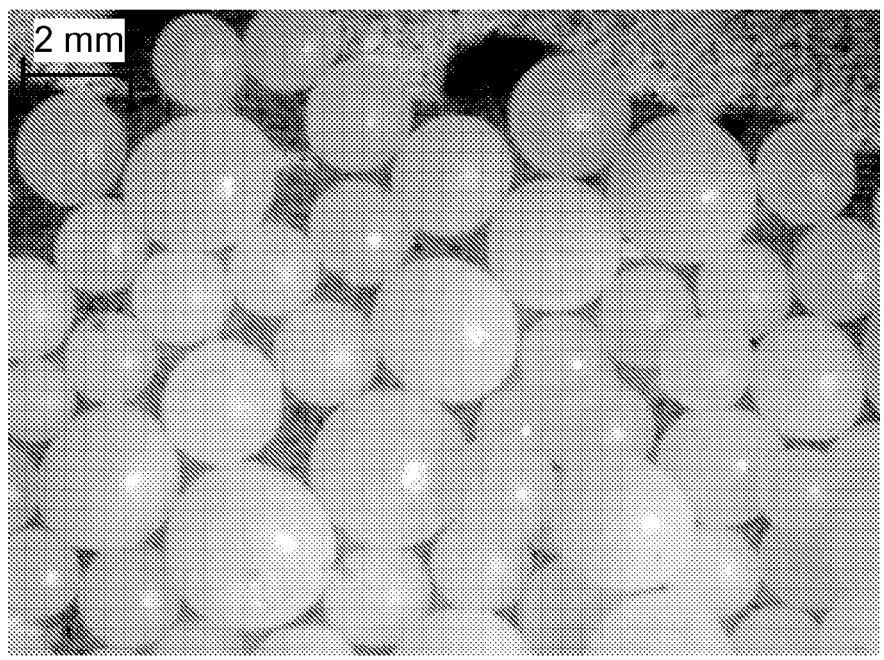
FIG. 5a is an optical micrograph of potassium nitrate prill before coating, wherein the scale is 2 mm.
Figure 5B:
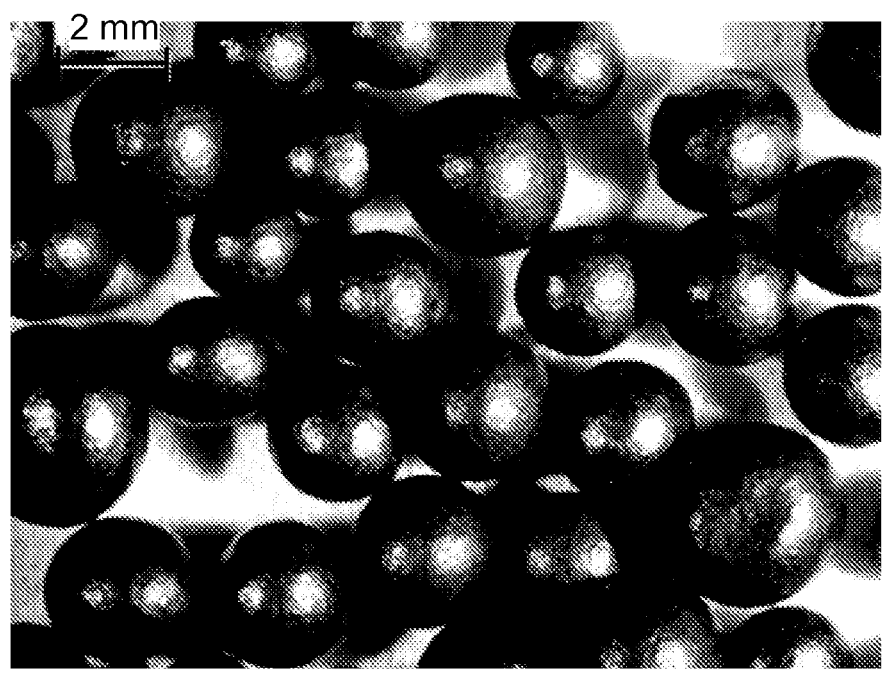
FIG. 5b is an optical micrograph of potassium nitrate prill after coating with zein and carbon black, wherein the scale is 2 mm.
Figure 5C:
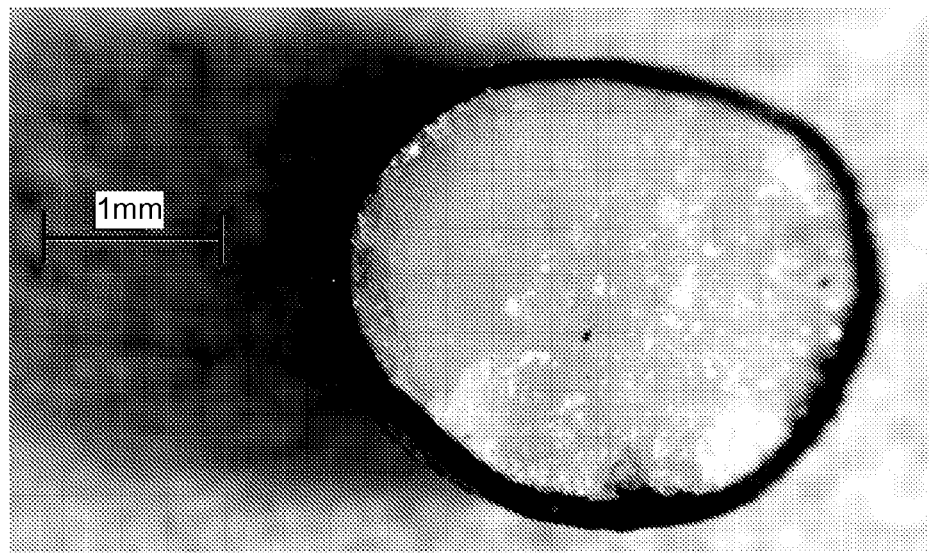
FIG. 5c is an optical micrograph of a cross-section of a potassium nitrate prill after coating with zein and carbon black, wherein the scale is 1 mm.
Figure 5D:
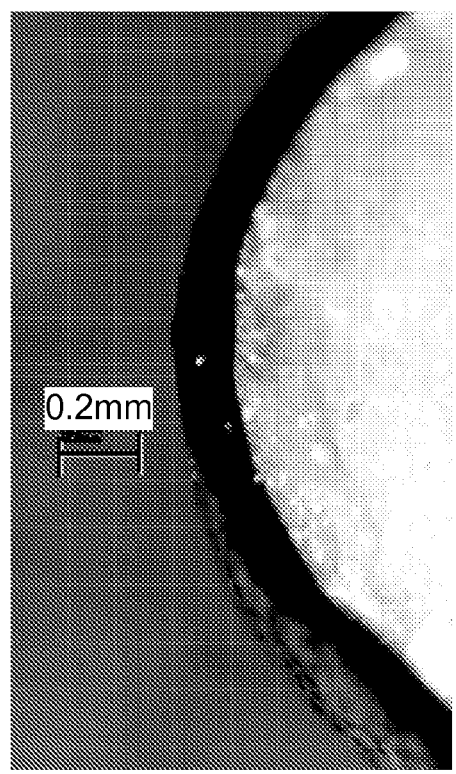
FIG. 5d is an optical micrograph of a close up of the cross-section of the potassium nitrate prill after coating with zein and carbon black seen in FIG. 5c, wherein the scale is 0.2 mm.

Upon initial review, the following observations were made. Samples 1 and 2 include prills coated with zein for both the film former and binder with carbon black (sample 1) and montmorillonite clay (sample 2) according to the formulations set forth in Table 1. The resulting coating thickness was approximately 150 μm. FIG. 5a illustrates optical micrographs of the prills before coating, FIG. 5b illustrates optical micrographs of the prills after coating, and FIG. 5c illustrates optical micrographs of a cross section of the prills. Upon exposure to heat at 200° C., the thermal stability of these capsules was found to be poor.

In addition, a number of different combinations of film formers and binders were then tested with and without the addition of a inorganic filler. Without the use of a film former, (samples 4 through 7) the coatings including a binder and the inorganic filler, were rough and potentially porous.

Thermal stability studies were then performed, the results of which are presented in Table 2. The thermal treatments were performed at 200° C., 300° C., and 375° C. Ramp rate to achieve the treatment temperatures were 0.1° C./min and for the fast run the capsules were placed into an oven preheated at 300° C. and the rate of temperature increase was understood to be 50° C./min. Ramp rates were adjusted to lower values when gas is evolved from within the capsule. The final weight was determined before heating and after the addition of coatings.

| Sample | 200° C. | 300° C. Slow | 300° C. Fast | 375° C. | Start Wt. | Final Wt. | Final % | Comments |
|---|---|---|---|---|---|---|---|---|
| 1 | X | | | X | 50 | | | |
| 2 | X | | | X | 50 | | | |
| 3 | | | | X | 50 | | | |
| 4 | X | | | X | 50 | | | |
| 5 | | | | X | 50 | | | |

-continued

| Sample | 200° C. | 300° C. Slow | 300° C. Fast | 375° C. | Start Wt. | Final Wt. | Final % | Comments |
|---|---|---|---|---|---|---|---|---|
| 6 | X | | | X | 50 | | | |
| 7 | X | | | X | 50 | | | |
| 8 | X | | | X | 50 | | | |
| 9 | X | | X | X | 50 | | | |
| 10 | X | | | X | 50 | | | |
| 11 | X | | X | X | 50 | 65 | 23.08 | |
| 12 | X | | X | X | 50 | | | |
| 14 | X | | | X | 50 | | | |
| 15 | X | | X | X | 50 | | | |
| 16 | X | | | X | 50 | 66.7 | 25.04 | |
| 17 | X | | X | X | 50 | | | |
| 18 | X | | | X | 50 | | | |
| 19 | X | | | X | 50 | | | |
| 20 | X | | | X | 50 | 61.8 | 19.09 | |
| 21 | X | | | X | 50 | 71.9 | 30.46 | |
| 22 | | | | X | 50 | 51.8 | 3.475 | |
| 23 | X | | | X | 50 | | | |
| 26 | | | | X | 50 | | | |
| 27 | | | | X | 50 | | | |
| 28 | | | | X | 50 | | | |
| 29 | X | Y | Y | X | 50 | | | |
| 30 | X | | | X | 50 | 82.5 | 39.39 | |
| 31 | Y | Y | X | X | 50 | 68.7 | 27.22 | |
| 32 | Y | Y | X | X | 50 | 70.8 | 28.38 | |
| 33 | Y | Y | Y | X | 50 | 108.3 | 53.83 | |
| 34 | | X | X | X | 50 | 112 | 55.36 | |
| 35 | Y | Y | Y | X | 50 | 77.3 | 35.32 | Applied on sample 22 capsules |
| 36 | X | X | X | X | 51 | 84 | 39.29 | Applied on sample 27 capsules |
| 37 | X | X | X | X | 49 | 72.8 | 32.69 | Applied on sample 26 capsules |
| 38 | | | | X | 50 | | | |
| 39 | | | | X | 50 | | | |
| 41 | X | X | X | X | 50 | | | |
| 42 | | X | | X | 42.6 | 73.3 | 41.88 | |
| 43 | | X | | X | 50 | | | |
| 44 | | | | | 160 | 164.6 | 2.795 | |
| 45 | X | X | | | 50 | 58.7 | 14.82 | Applied on sample 44 capsules |
| 46 | | X | | | 50 | 77.2 | 35.23 | Applied on sample 44 capsules |
| 47 | | | | | 50 | | | |

Figure 6A:
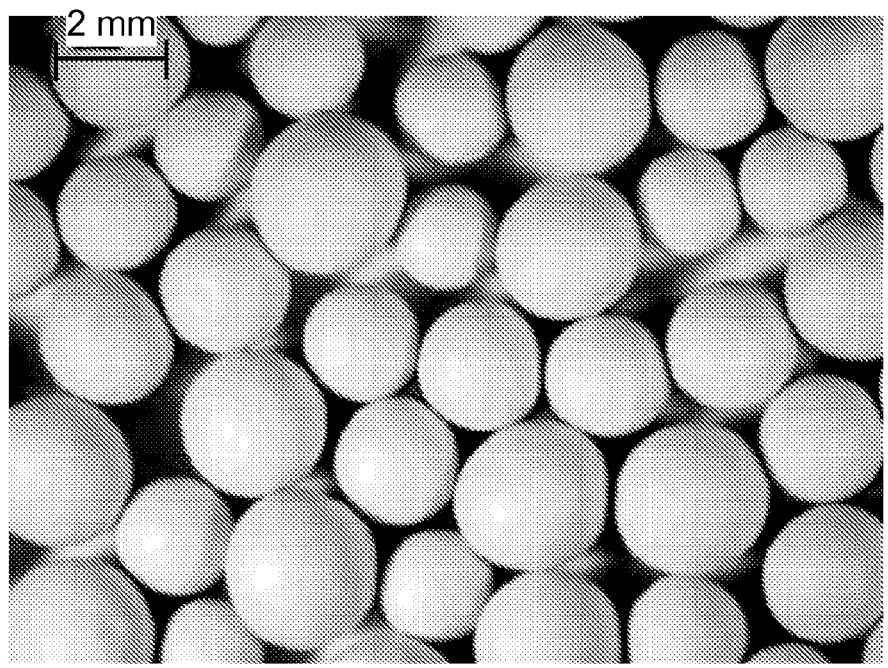
FIG. 6a is an optical micrograph of a microencapsulated potassium nitrate prills coated as set forth in sample 33, wherein the scale is 2 mm.
Figure 6B:
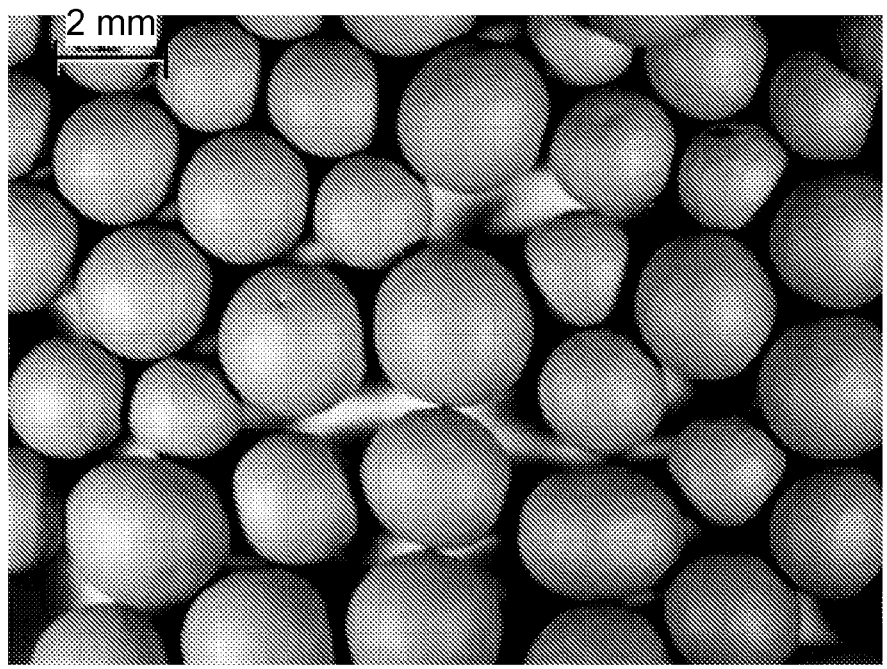
FIG. 6b is an optical micrograph of sample 33 microcapsules heat treated at 200° C., wherein the scale is 2 mm.
Figure 6C:
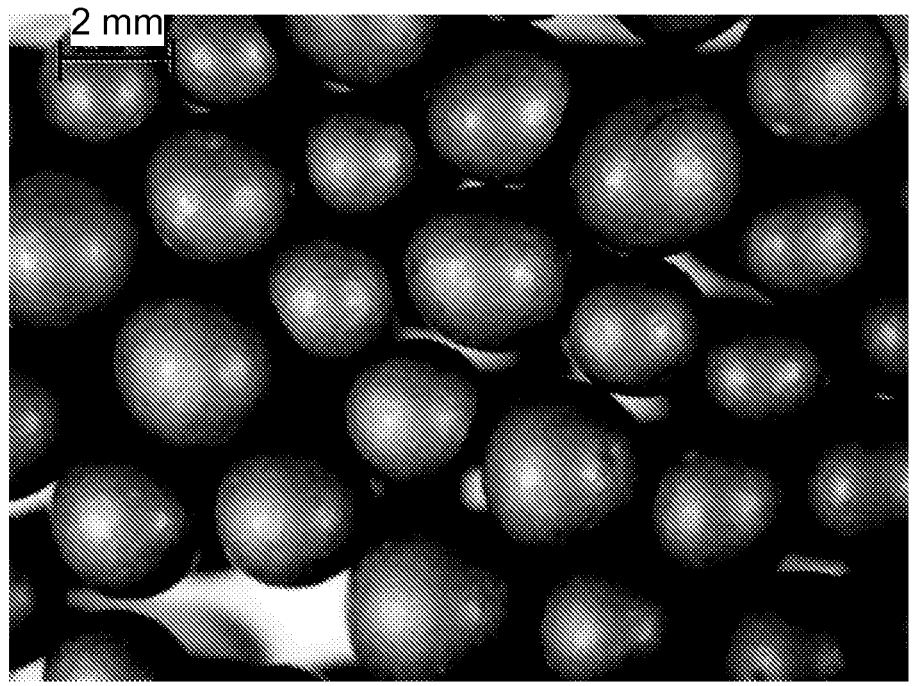
FIG. 6c is an optical micrograph of sample 33 microcapsules heat treated at 275° C., wherein the scale is 2 mm.
Figure 6D:
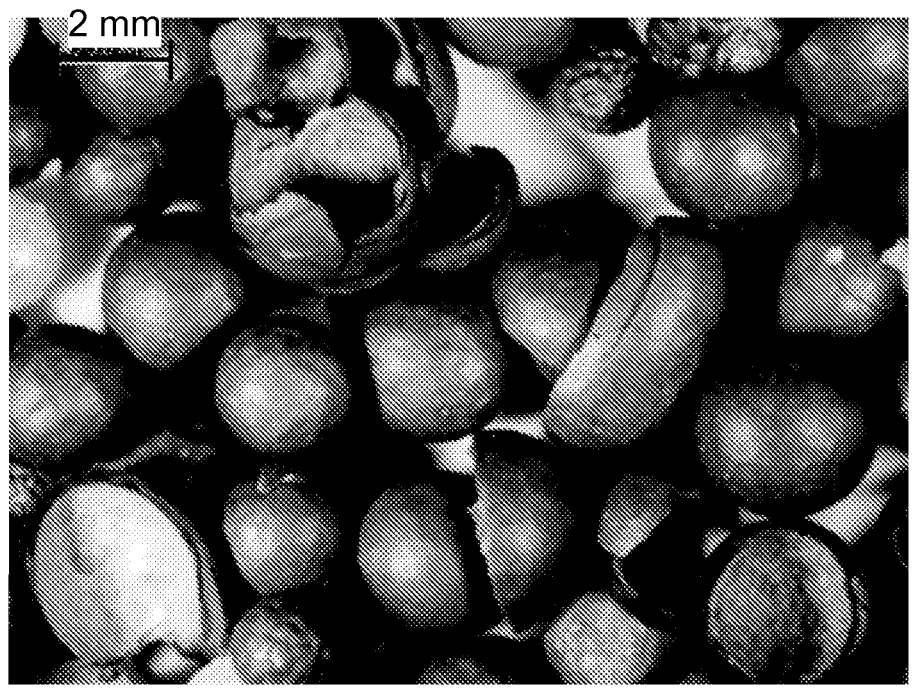
FIG. 6d is an optical micrograph of similarly prepared microcapsules as set forth in sample 31 heat treated at 275° C., wherein the scale is 2 mm.

Thermal treatment indicated that the coating compositions including 32% wt Ceramabind 644A as a binder, 5% wt ethyl cellulose as a film former, and 63% natural clay as an inorganic filler (samples 33 and 35), remained stable at temperatures of up to and including 300° C. FIG. 6a illustrates optical micrographs of potassium nitrate beads with microcapsule shells including 32% Ceramabind, 5% wt ethyl cellulose, and 63% natural clay shells. FIG. 6b illustrates optical micrographs of those shells heat treated at 200° C. for 12 to 24 hours. FIG. 6c illustrates the same microcapsules heat treated at 275° C. As illustrated the shells remained intact and were thermally stable at the elevated temperature. FIG. 6d illustrates optical micrographs of similarly prepared shells with 32% Ceramabind, 2.5% wt ethyl cellulose, and 65% natural clay shells treated at 275° C. for 12 to 24 hours.

Figure 7A:
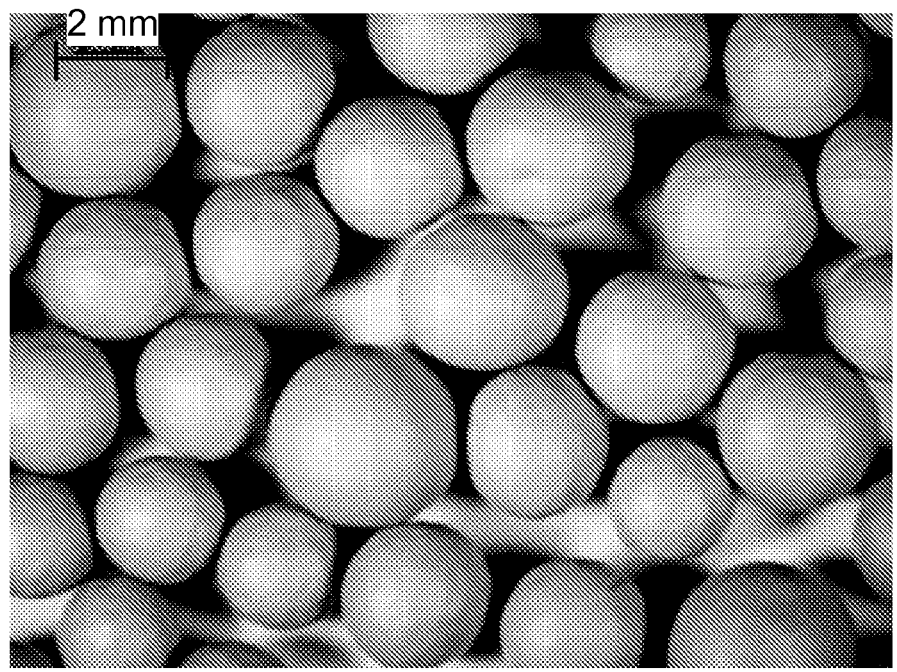
FIG. 7a illustrates microcapsules prepared according to sample 35 and heat treated at 200° C., wherein the scale is 2 mm.
Figure 7B:
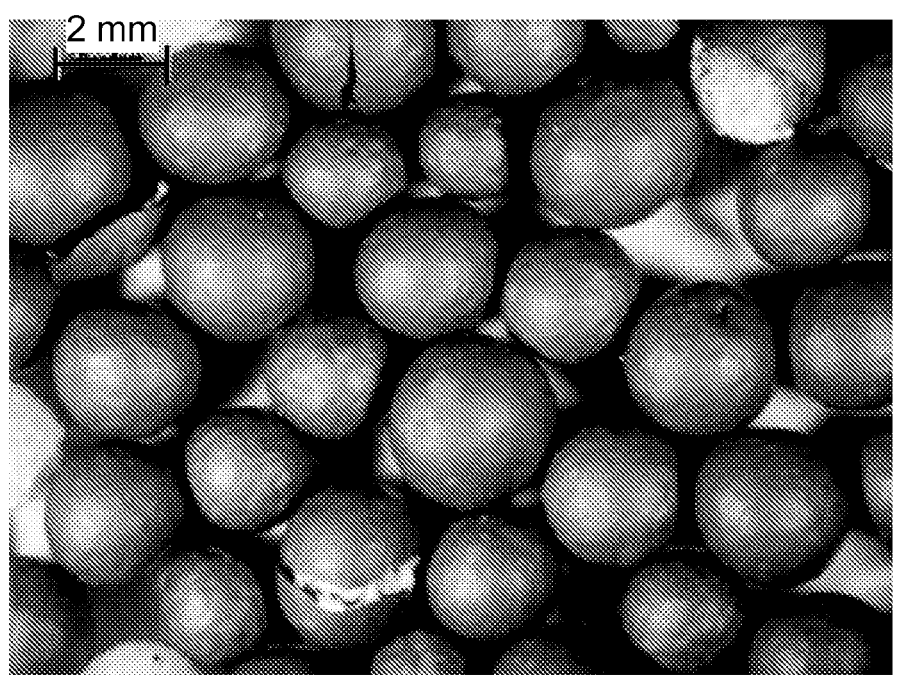
FIG. 7b illustrates microcapsules prepared according to sample 35 and heat treated at 250° C., wherein the scale is 2 mm.
Figure 7C:
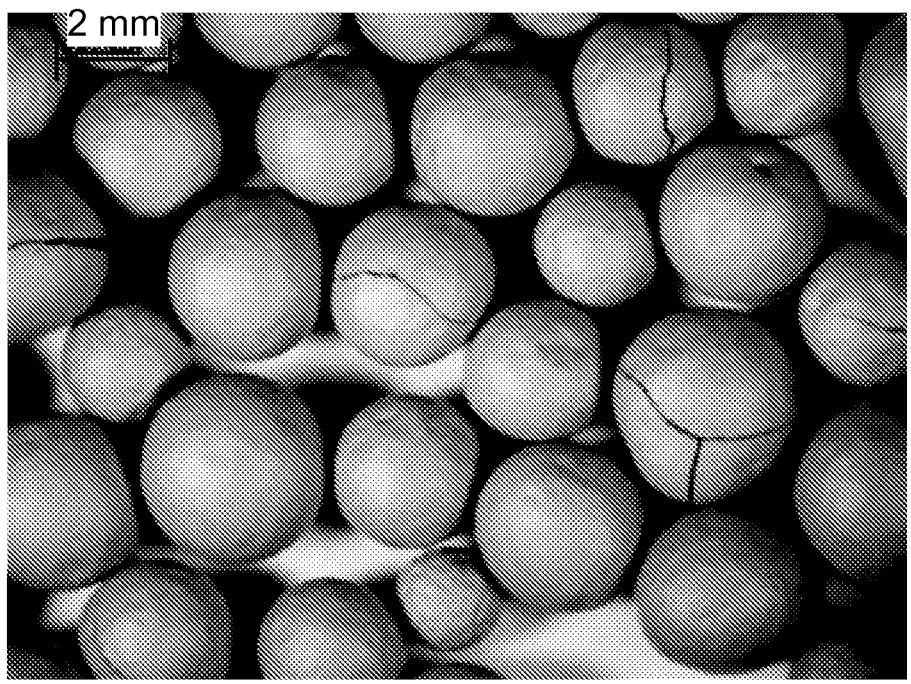
FIG. 7c illustrates microcapsules prepared according to sample 36 and heat treated at 200° C., wherein the scale is 2 mm.
Figure 7D:
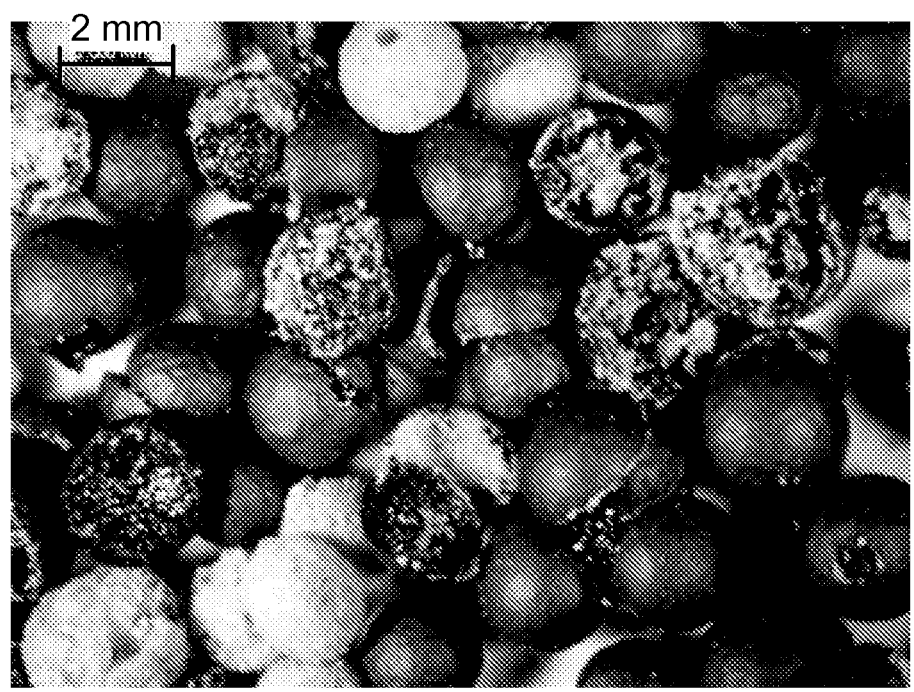
FIG. 7d illustrates microcapsules prepared according to sample 36 and heat treated at 250° C., wherein the scale is 2 mm.
Figure 7E:
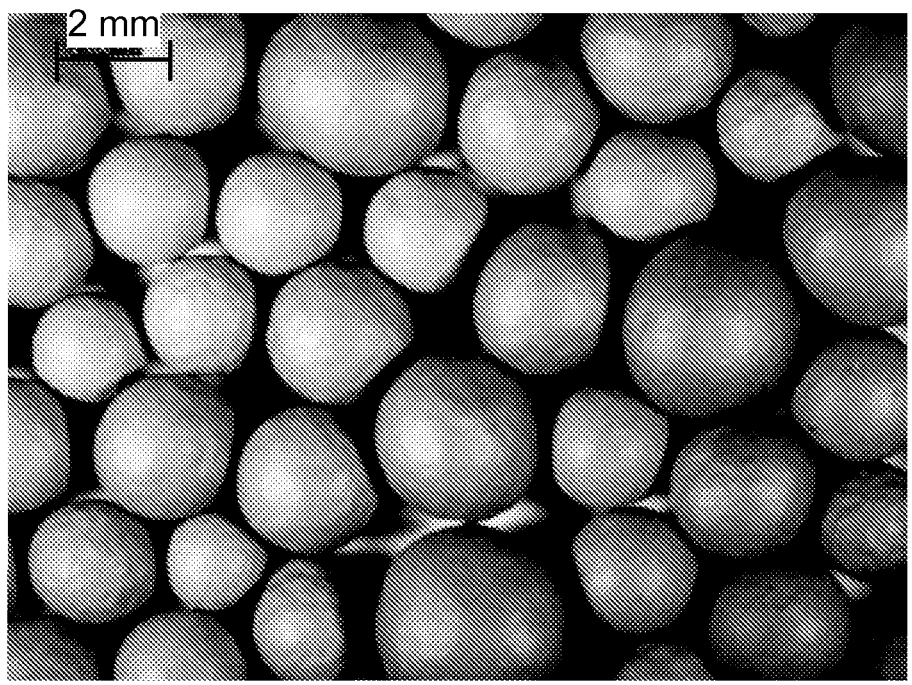
FIG. 7e illustrates microcapsules prepared according to sample 37 and heat treated at 200° C., wherein the scale is 2 mm.
Figure 7F:
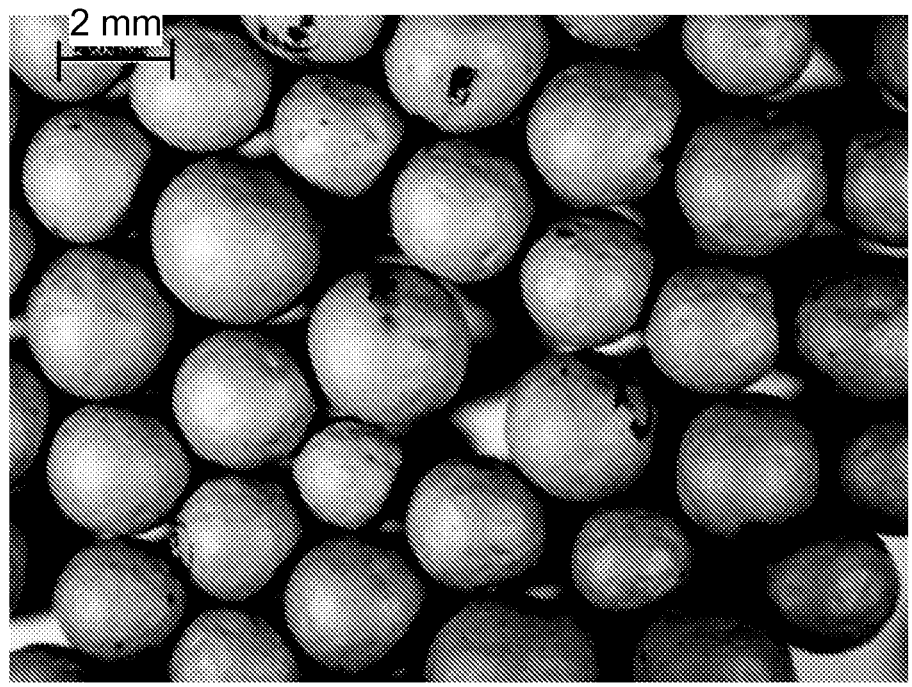
FIG. 7f illustrates microcapsules prepared according to sample 37 and heat treated at 250° C., wherein the scale is 2 mm.

Optical micrographs of samples 35, 36 and 37, including sacrificial layers, are illustrated in FIGS. 7a, 7b, 7c, 7d, 7e and 7f after heat treatments at 200° C. and 250° C. for 12 to 24 hours. As seen in the images, coating sample 35 including hydroxypropyl methyl cellulose as a sacrificial layer and ethyl cellulose as the film former at 5% by wt remained intact at both heat treatment temperatures of 200° C. (FIG. 7a) and at least 50% of the microcapsule shells remained intact and were thermally stable at 250° C. (FIG. 7b). Whereas the sample including zein as a sacrificial layer, sample 36 began to crack at 200° C. (FIG. 7c) and completely deteriorate at 250° C. (FIG. 7d). The microcapsules of sample 37, including ethyl cellulose as a sacrificial layer, remained intact and were thermally stable when heat treated at temperatures of 200° C. and 250° C. (FIGS. 7e and 7f).

Example 2

Preparation of microencapsulated phase change compositions including a coating layer, a sacrificial layer and an inorganic layer, such as those illustrated in FIG. 2, began with the use of salt core prills of potassium nitrate ($KNO_3$) with a starting size in the range of 2 to 4 mm. The coating layer and inorganic layer were prepared from the same composition according to the formulation set forth in Table 3.

TABLE 3

Coating and Inorganic Layer Formulation

| | Component | Amount (g) |
|---|---|---|
| Binder | Alumina Binder - Ceramabind 644A | 6 |
| Film Former | Ethyl Cellulose - Aquacoat | 1 |
| Inorganic Filler | Montmorillonite Clay - Cloisite Na+ | 7.5 |
| Surfactant | Sorbitan monooleate - Span 80 | 0.1 |
| Carrier | Water | 150 |
| | Ethanol | 50 |

The sacrificial layer was prepared from a solution of hydroxypropyl methyl cellulose in 90/10 ethanol/water. The concentration of the solution of 4% of HPMC in water/ethanol. The HPMC was METHOCEL E6LV available from DOW, with 29% methoxyl content.

The layers were then applied to the prills utilizing the method described above, i.e. First the inorganic coated layer was applied, then the sacrificial layer was applied and then the coating layer was applied.

The salt core prills were present at 44% by weight of the final product, the inorganic layer was present at 9% by weight of the final product, the sacrificial layer was present at 19% by weight of the final product and the coating layer was present at 29% by weight of the final product.

The prepared microencapsulated phase change particles were then heat treated in to determine the stability of the capsules. The heat treatment conditions were as set forth in Table 4. Heat treatments were successive with 1° C./min ramps in between.

TABLE 4

Heat Treatment Conditions

| Sample | Temperature (° C.) | Ramp Time (hours) |
|---|---|---|
| 1 | 225 | 12 |
| 2 | 250 | 12 |
| 3 | 260 | 12 |
| 4 | 270 | 12 |
| 5 | 280 | 12 |
| 6 | 290 | 8 |
| 7 | 300 | 12 |
| 8 | 310 | 8 |
| 9 | 315 | 12 |
| 10 | 320 | 8 |
| 11 | 325 | 12 |
| 12 | 25° C. to 50° increments | 4-8 hour ramp |

Figure 8A:
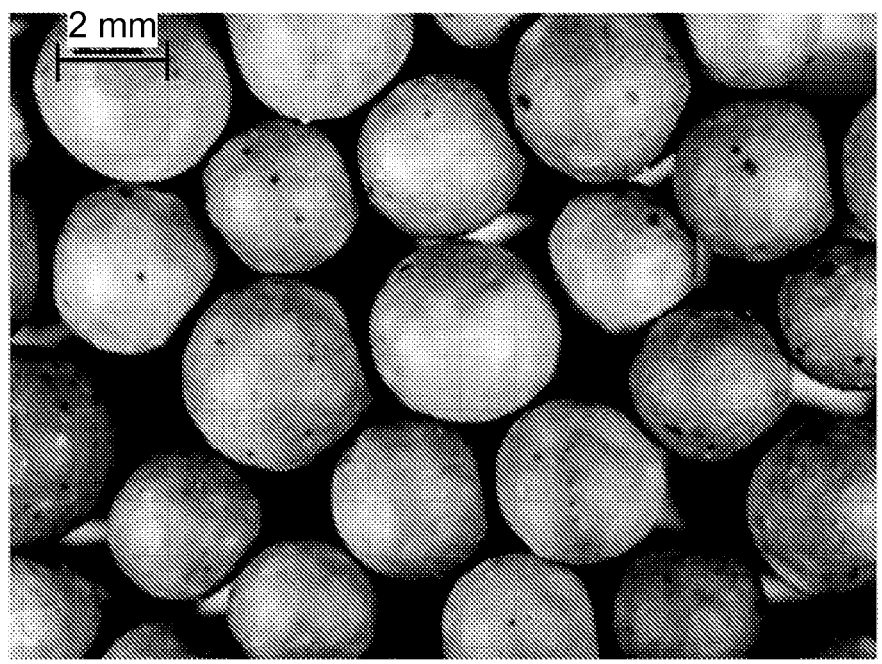
FIG. 8*a* is an optical micrograph of microcapsules prepared according to example 2 and heat treated at 375° C., wherein the scale is 2 mm.
Figure 8B:
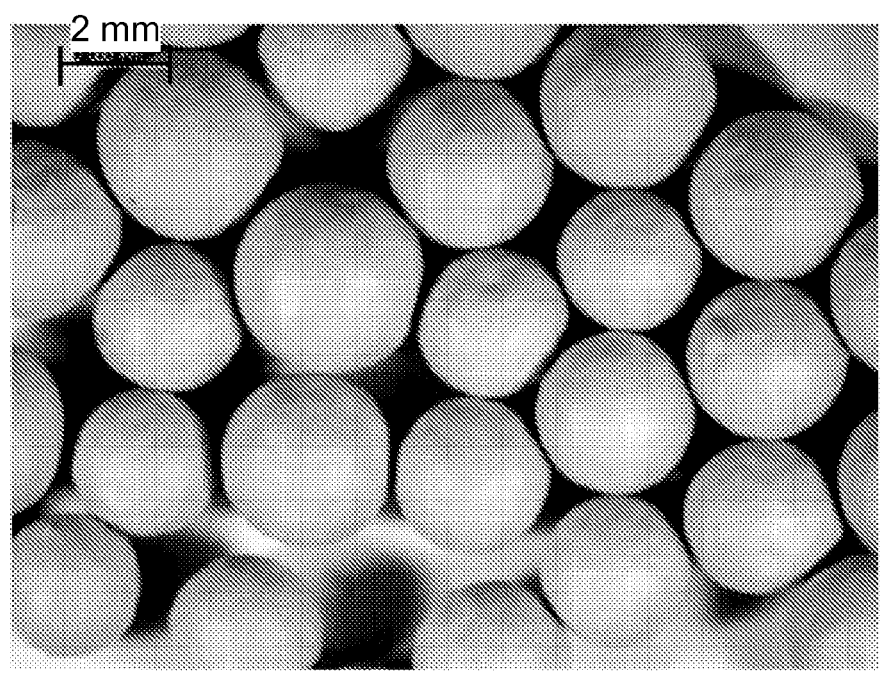
FIG. 8*b* is an optical micrograph of microcapsules prepared according to example 2 and heat treated at 495° C., wherein the scale is 2 mm.
Figure 8C:
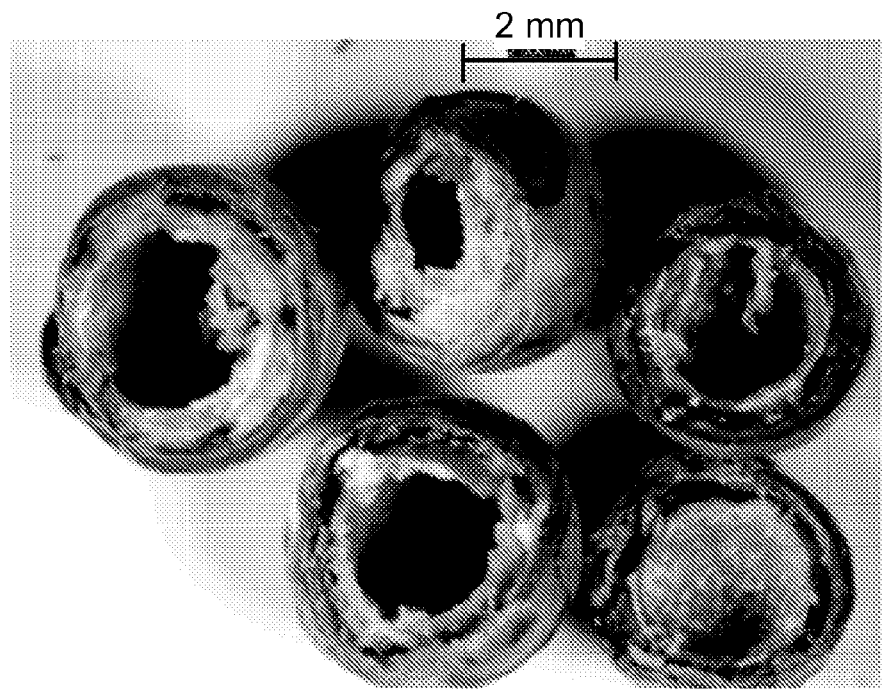
FIG. 8*c* is an optical micrograph of a cross-section of the microcapsules prepared according to example 2 and heat treated at 375° C., wherein the scale is 2 mm.
Figure 8D:
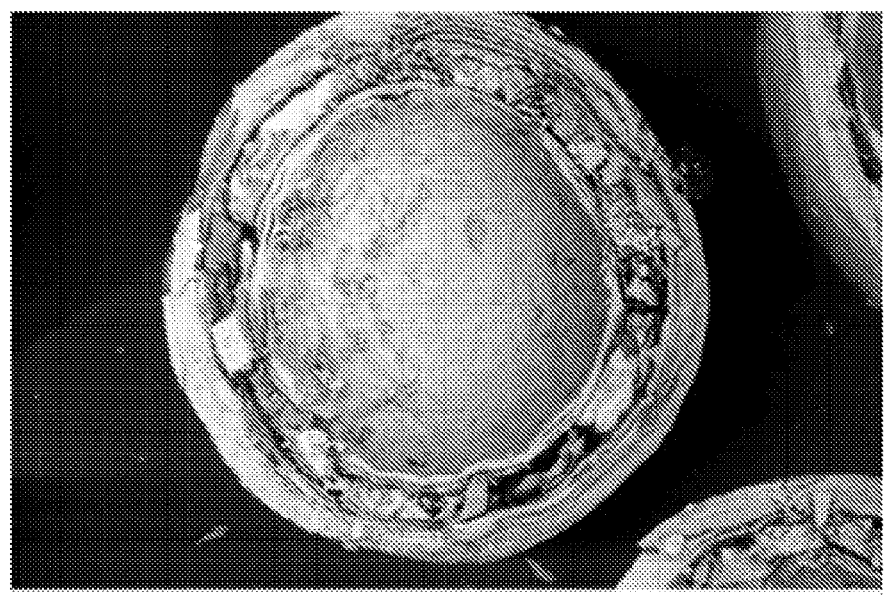
FIG. 8*d* is an electron micrograph of a cross-section of the microcapsules prepared according to example 2 and heat treated at 495° C., wherein the scale is 200 µm.

The heat treated capsules are illustrated in FIGS. 8a, 8b, 8c and 8d. FIGS. 8a and 8b show images of the treated capsules, which were treated at 375° C. and 495° C., respectively. Color change is caused by oxidation and removal of the carbon based sacrificial material. The corresponding cross-sections illustrated in FIGS. 8c and 8d, for FIGS. 8a and 8b respectively, illustrate that upon cooling the salts contract and solidify inside the capsules, typically on the inner surface of the capsule shell leaving a void in the center of the capsule.

Figure 9:
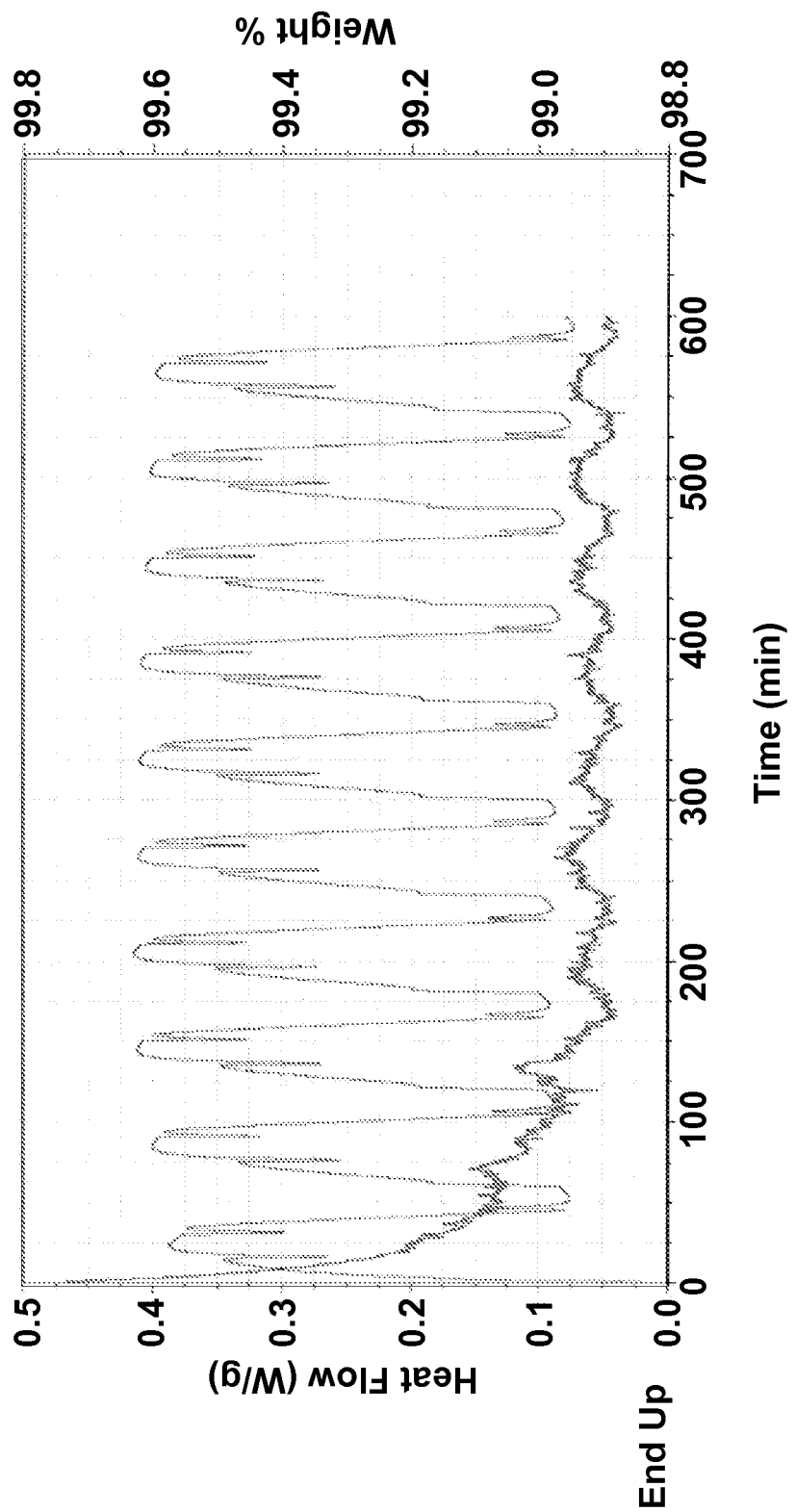
FIG. 9 is a graph of time versus heat flow and time versus weight change for microcapsules prepared according to example 2 and measured using DSC and TGA.

The microcapsules were also thermally cycled ten times between 250° C. and 400° C. to melt and freeze the salt within the capsules. FIG. 9 illustrates the differential scanning calorimetry (DSC) curve and the thermogravimetric analysis (TGA) curve. As illustrated, the weight loss stabilizes over the 10 hour run. The DSC results also illustrate the melting and freezing during each thermal cycle, demonstrating that the microcapsules may be exposed to cyclic temperatures during thermal energy storage.

Figure 10:
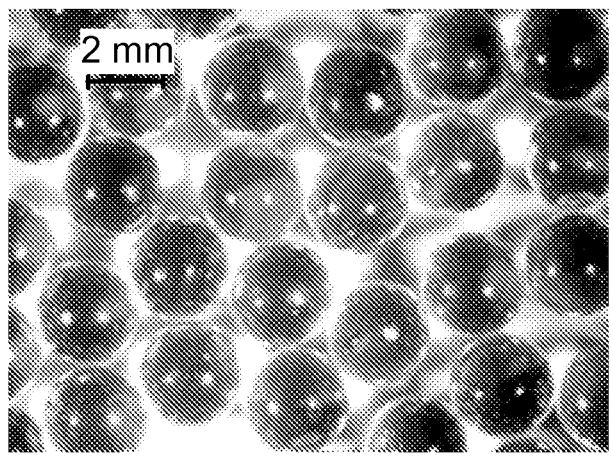
FIG. 10 is an optical micrograph of glass beads, wherein the scale is 2 mm.
Figure 11:
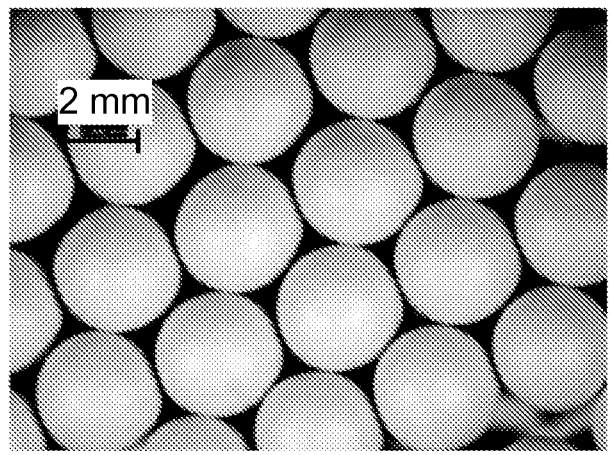
FIG. 11 is an optical micrograph of glass beads prepared with a single layer microcapsule shell, wherein the scale is 2 mm.
Figure 12:
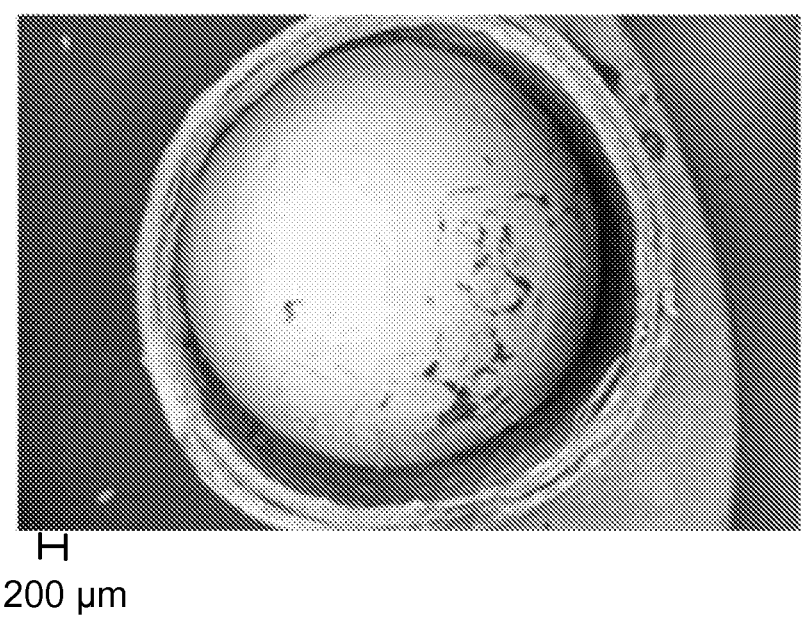
FIG. 12 is an optical micrograph of glass beads prepared with a sacrificial layer and a coating layer in the microcapsule shell, wherein the scale is 2 mm.

To demonstrate the robustness of the microcapsules to relatively high temperature environments without the interference of potassium nitrate (KNO$_3$) reactivity and volume expansion, capsules were prepared with a glass core, which are illustrated in FIG. 10. Two glass bead samples were prepared; one with a clay shell illustrated in FIG. 11 and one with a double layer illustrated in FIG. 12, i.e., sacrificial layer and coating layer shell of HPMC and clay, binder and film former. The single layer samples were prepared using the composition described above for the inorganic and coating layers and the double layer samples were prepared using the compositions described above for the sacrificial layer and the coating layer.

Figure 13:
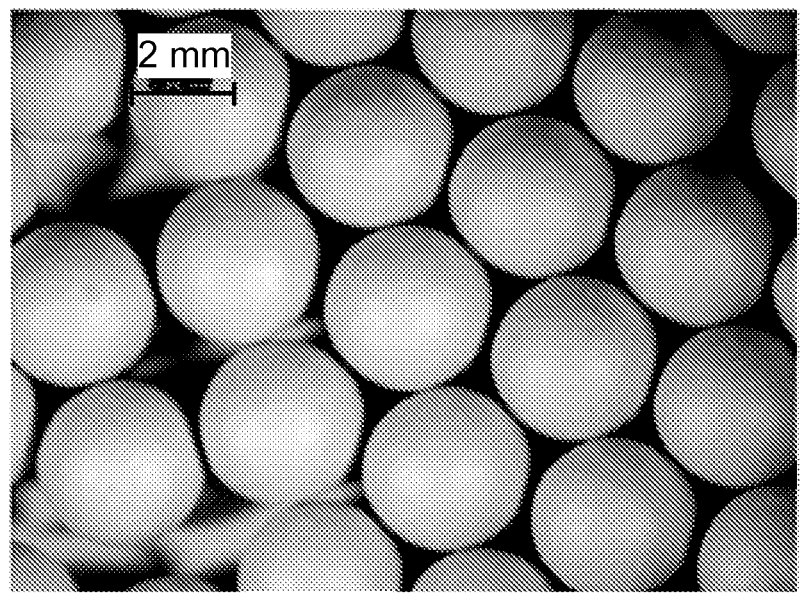
FIG. 13 is an optical micrograph of beads including a single layer microcapsule shell of FIG. 11 heat treated at over 600° C., wherein the scale is 2 mm.
Figure 14:
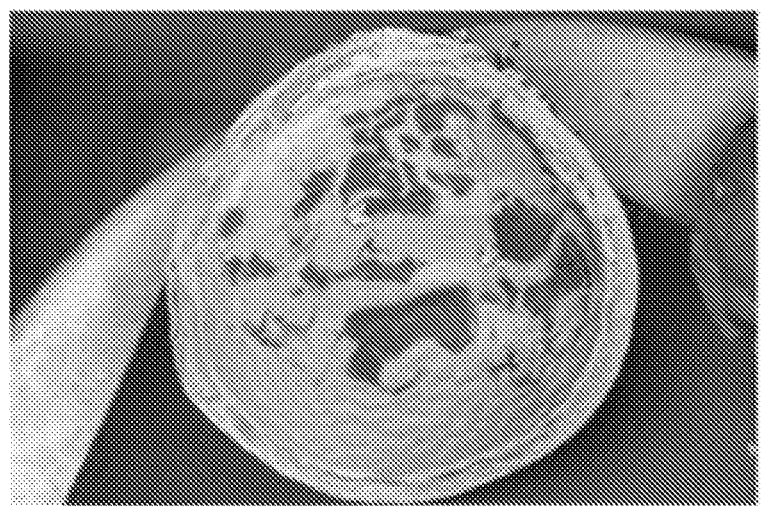
FIG. 14 is an optical micrograph of a bead double layer microcapsule shell after heating at a temperature of 310° C., wherein the scale is 200 µm.
Figure 15:
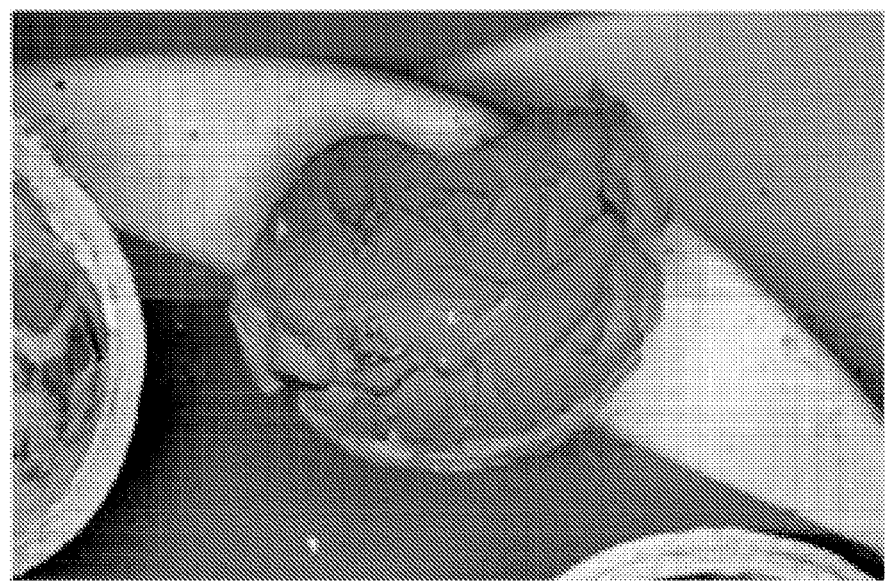
FIG. 15 is an optical micrograph of residual carbon, wherein the scale is 200 µm.

FIG. 13 illustrates the single layer capsule heated at over 600° C. for 12 hrs. Such heating demonstrates the suitability of the coating compositions for relatively high temperature applications as the microcapsule shells remained intact and were thermally stable. FIG. 14 illustrates a double layer capsule after heating at a temperature of 310° C. with residual carbon and FIG. 15 illustrates a piece of carbon sacrificial layer that did not completely burn away during the heat treatment process. The double layer capsule did rupture in most cases, indicated that the rupture problem is likely due to the evolution in gas, rather than due to the expansion of the KNO$_3$ core.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of encapsulating microcapsules containing phase change material, comprising:
supplying a phase change material comprising an inorganic salt selected from nitrates, nitrites, and hydroxides of potassium, lithium and combinations thereof, having a melting point of 200° C. to 600° C., and a largest cross-sectional dimension of 0.5 mm to 100 mm;
applying a coating to said phase change material wherein said coating includes an inorganic binder, a film former comprising an organic polymer at a MW of greater than or equal to 5000, and an inorganic filler at a particle size of less than or equal to 50 μm and wherein said coating has a thickness of 50 μm to 1000 μm; and
heating said coating at a temperature in the range 200° C. to 400° C. wherein at least a portion of said organic polymer of said film former is removed to form said microcapsules, wherein from 0% to 5% of said microcapsules rupture at temperatures of 200° C. to 600° C.

2. The method of claim 1 wherein said binder is present in the range of 5% to 30% by wt. relative to the combination of binder, film former and inorganic filler, said film former is present in the range of 1% to 10% by wt. relative to the combination of binder, film former and inorganic filler, and said inorganic filler is present in the range of 50% to 90% by wt. relative to the combination of binder, film former and inorganic filler.

3. The method of claim 1, wherein said binder comprises an inorganic aluminum colloid and is present in the range of 15% to 25% by wt. relative to the combination of binder, film former and inorganic filler, said film former comprises ethyl cellulose and is present in the range of 1% to 10% by wt. relative to the combination of binder, film former and inorganic filler, and said inorganic filler comprises mineral silicate and is present in the range of 70% to 85% by wt. relative to the combination of binder, film former and inorganic filler.

4. The method of claim 1 wherein 80% or more of the organic polymer of the film former is removed with heating.

5. The method of claim 1 wherein said inorganic binder comprises an inorganic solvent based binder applied to said phase change material comprising dispersed phase inorganic particles wherein said particles are present at a size of 1 nm to 1000 nm.

6. The method of claim 1 wherein said inorganic binder comprises dispersed aluminum particles.

7. The method of claim 1 wherein said inorganic filler comprises mineral silicates, clay, silica, and/or micronized stainless steel.

8. The method of claim 1, wherein said microcapsule shell further includes a sacrificial layer, wherein said sacrificial layer is disposed between said phase change material and said coating layer and wherein said heating of said coating removes said sacrificial layer and provides a space as between said coating layer and said phase change material.

9. The method of claim 8 wherein said sacrificial layer comprises an organic polymeric resin that thermally degrades upon exposure to heat.

10. The method of claim 8 wherein said sacrificial layer comprises hydroxyl-propyl methyl cellulose, plant protein or ethyl cellulose.

11. The method of claim 8 wherein said sacrificial layer has a thickness of 1.0 μm to 500 μm.

12. The method of claim 1 wherein said microcapsules are packed in a storage tank containing a heat transfer fluid.

\* \* \* \* \*